(12) United States Patent
Wang et al.

(10) Patent No.: US 11,321,529 B2
(45) Date of Patent: May 3, 2022

(54) DATE AND DATE-RANGE EXTRACTOR

(71) Applicant: Microsoft Technology Licensing, LLC, Redmond, WA (US)

(72) Inventors: Ying Wang, Shanghai (CN); Min Li, Shanghai (CN); Mengyan Lu, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/313,758

(22) PCT Filed: Dec. 25, 2018

(86) PCT No.: PCT/CN2018/123352
§ 371 (c)(1),
(2) Date: Dec. 27, 2018

(87) PCT Pub. No.: WO2020/132851
PCT Pub. Date: Jul. 2, 2020

(65) Prior Publication Data
US 2021/0326534 A1  Oct. 21, 2021

(51) Int. Cl.
*G06F 40/295* (2020.01)
*G06F 40/205* (2020.01)

(52) U.S. Cl.
CPC .......... *G06F 40/295* (2020.01); *G06F 40/205* (2020.01)

(58) Field of Classification Search
CPC ....................... G06F 40/00–58; G06F 16/3344
USPC ............................ 704/1, 9, 10, 257, 270–275
See application file for complete search history.

(56) References Cited

U.S. PATENT DOCUMENTS

| 2006/0245641 | A1* | 11/2006 | Viola | G06F 40/295 382/155 |
| 2008/0154897 | A1* | 6/2008 | Meliha | G06F 16/258 |
| 2011/0246462 | A1 | 10/2011 | Wu et al. | |
| 2014/0101542 | A1 | 4/2014 | Albrecht et al. | |
| 2014/0365879 | A1* | 12/2014 | Lefor | G06F 40/279 715/261 |
| 2015/0193391 | A1* | 7/2015 | Khvostichenko | G06F 40/279 715/205 |
| 2016/0259778 | A1* | 9/2016 | Cookson | G06Q 10/107 |
| 2016/0314123 | A1* | 10/2016 | Ramachandran | G06F 40/284 |

(Continued)

FOREIGN PATENT DOCUMENTS

| CN | 101950286 A | 1/2011 |
| CN | 102314417 A | 1/2012 |

OTHER PUBLICATIONS

"International Search Report and Written Opinion Issued in PCT Application No. PCT/CN18/123352", dated Sep. 24, 2019, 10 Pages.

*Primary Examiner* — Jesse S Pullias (57) ABSTRACT

A date extractor disclosed herein allows extracting dates and date ranges from documents. An implementation of the date extractor is implemented using various computer process instructions including scanning a document to generate a plurality of tokens, assigning labels to token using named entity recognition machine to generate a named entity vector, extracting dates from the named entity vector by comparing each of the named entities of the named entity vector to predetermined patterns of dates to generate a date vector, generating a plurality of date pairs from the date vector, and extracting date-ranges by comparing the plurality of date pairs to predetermined patterns of date ranges.

20 Claims, 5 Drawing Sheets

(56) References Cited

U.S. PATENT DOCUMENTS

2016/0328407 A1* 11/2016 Levy .................... G06F 16/248
2017/0132313 A1    5/2017 Kukla et al.
2017/0300565 A1* 10/2017 Calapodescu ......... G06F 16/278

* cited by examiner

| 402 | ... between 27/11/2016 and 3/4/2017 | | | | | | | | | | |
|---|---|---|---|---|---|---|---|---|---|---|---|
| 404 | Between | 27 | / | 11 | / | 2016 | and | 3 | / | 4 | / | 2017 |
| 406 | O | Day | Splitter | MonthOrDay | Splitter | Year | O | MonthOrDay | Splitter | MonthOrDay | Splitter | Year |
| 408 | | 27 -> Day => 11 -> Month<br>11/27/2016 (determined) | | | | | | 3 -> MonthOrDay, 4 -> MonthOrDay<br>03/04/2017 (not determined) | | | |
| 410 | | 27 -> Day, 11 -> Month => 3 -> Day, 4 -> Month<br>Char count between 2 dates is 5; (DMY, DMY)<br>11/27/2016 -- 04/03/2017 (determined) | | | | | | | | | |

DATE AND DATE-RANGE EXTRACTOR

BACKGROUND

Dates and date ranges in natural language documents have various formats. it may be difficult to enumerate all the patterns as the order of year, month, day is not fixed, and some parts of the date or date ranges may be omitted in a date range expression in documents. Furthermore, different countries and languages use different conventions for expressing dates and date ranges. Therefore, it is difficult to enumerate all the patterns with precision using current approaches and such current approaches are time prohibitive and expense to implement.

SUMMARY

A date extractor disclosed herein allows extracting dates and date ranges from documents. An implementation of the date extractor is implemented using various computer process instructions including scanning a document to generate a plurality of tokens, assigning labels to token using named entity recognition (NER) machine to generate a named entity vector, extracting dates from the named entity vector by comparing each of the named entities of the named entity vector to predetermined patterns of dates to generate a date vector, generating a plurality of date pairs from the date vector, and extracting date-ranges by comparing the plurality of date pairs to predetermined patterns of date ranges.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification.

DETAILED DESCRIPTION

Dates and date ranges in natural language have various formats, It's hard to enumerate all the patterns since the order of year, month, day is not fixed, and some parts could be omitted in a date range expression. For example, "2018-5-21~2018-6-20" may be represented in natural language by, "between May 21st and Jun 20th, 2018", "the 21st of May 2017 through the 20th of Jun 2018", "21/5/2018-20/6/2018", "May 2017 until Jun 2018", "27th to 30th May 2018", etc. Various attempts to address this variety of expressions in dates and date ranges use hard coded rules. However, uses such a solution, only the dates and date range patterns that exactly match one of the hard coded patterns is extracted.

Implementations disclosed here provide a date extractor system for extracting dates and date ranges from documents using automated process. An implementation of the date extractor system uses natural language processing (NLP) to extract the date and date range information from the documents. As shown below, the date extractor system disclosed herein is able to extract both dates and dates ranges with a high precision and recall rate in a sentence with good performance.

The technology disclosed herein solves a technical problem of identifying dates and date ranges automatically from documents. Specifically, the technology disclosed herein uses a named entity recognition (NER) machine to generate named entity vectors from a document. In one implementation, the NER machine labels various tokens from the document to generate a named entity vector. Subsequently, various dates from the named entity vector are extracted by comparing each of the named entities of the named entity vector to predetermined patterns of dates. Furthermore, the technology disclosed herein extracts date-ranges by comparing a plurality of date pairs to predetermined patterns of date ranges. The technology disclosed herein solves a technical problem of analyzing documents efficiently to recognize dates and date ranges therein without having to enumerate a large number of patterns or without having to provide a large number of coded rules.

Figure 1:
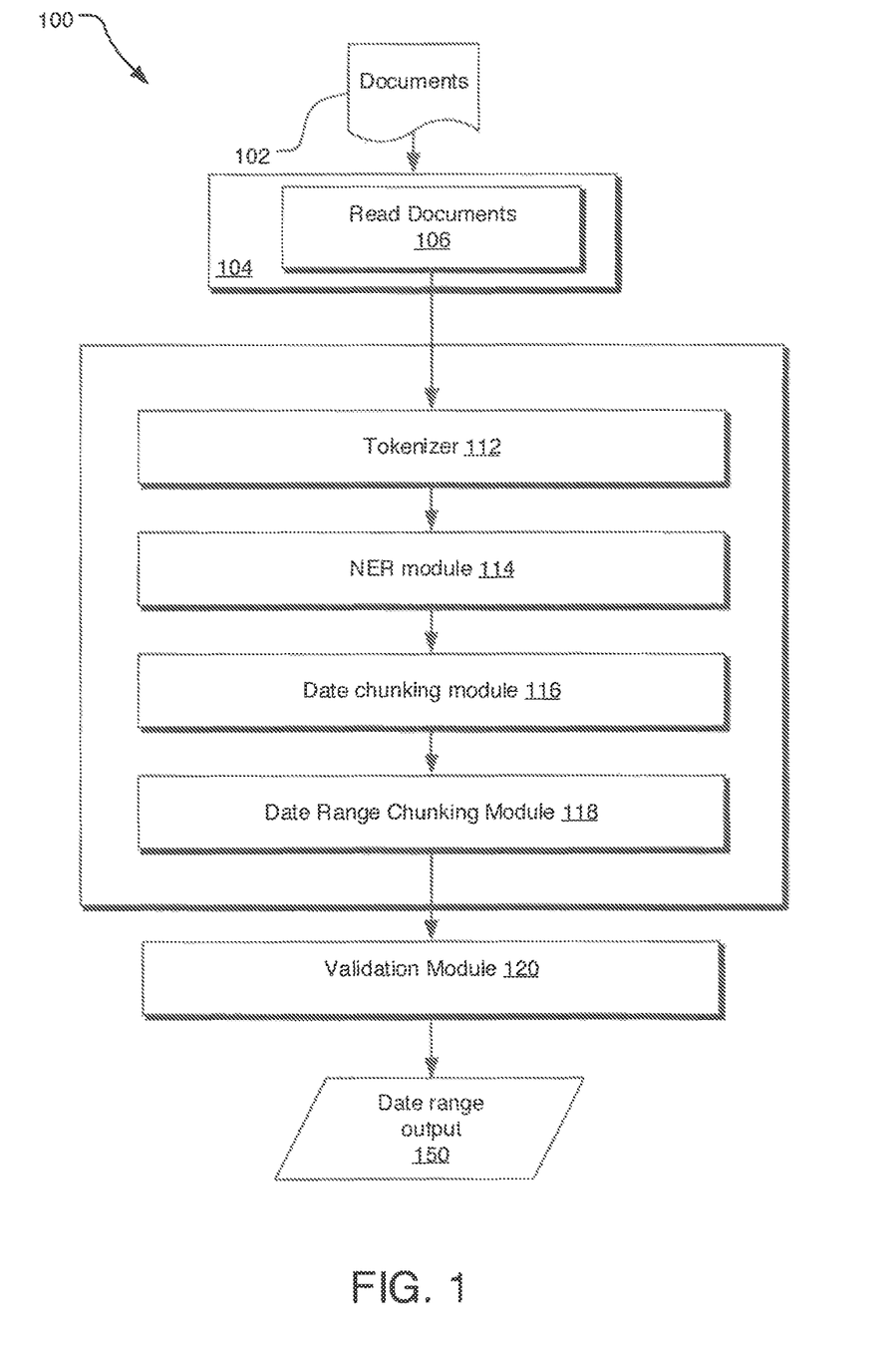
FIG. 1 illustrates an example implementation of a system for extracting dates and date ranges from documents.

FIG. 1 illustrates an example implementation of a date extractor system 100 for extracting dates and date ranges from documents. In one implementation, the date extractor system 100 may be deployed on a cloud environment. A document scanning module 104 of the date extractor system 100 scans document 102. For example, the documents 102 may include various natural language documents and the document scanning module 304 scans the documents 102 and may store sentences from the document in one or more databases.

Subsequently, a tokenizer module 112 splits the sentences scanned by the document scanning module 104 into words, where each word is referred to as a token. Furthermore, in one implementation, the tokenizer module 112 also splits or separates numbers and punctuations into separate tokens. For example, if a sentence into the tokenizer module is "2017-3-22", the tokenizer module 112 divides the sentence into the following tokens five '2017', '-', '3', '-', and '22'. In one implementation, the tokenizer module 112 is configured so that it truncates or ignores any blank spaces around the words, separators, etc. Thus, for example, if another sentence into the tokenizer module is "2017-3-22" the tokenizer module 112 still produces the same five output tokens '2017', '-', '3', '-', and '22', while ignoring the blank space between the tokens '2017' and '-', etc. The list of tokens output from the tokenizer module 214 is input to a named entity recognition (NER) module 114.

The NER module 114 labels each of the tokens with a named entity label or tag. For example, the NER module 114 defines such named entity labels, such as <Day>, <Month>, <Year>,<MonthOrDay>, <Splitter>, <Other>, etc. In one implementation, the NER module 114 labels each of the tokens with a label of <Day>, <Month>, <Year>,<MonthOrDay>, <Splitter>, except for the tokens that are not of interest, which are labeled with named entity label of <Other>. For example, the pattern of <Day>may be defined as cardinal number 13~31 and the ordinal number 1st~31st, the pattern of <MonthOrDay>could be defined as cardinal number 1-9, 01-09, 10-12, etc, A date chunking module 116 defines valid predetermined patterns of dates. Some of these predetermined patterns of dates may be cardinal date patterns, whereas others of the predetermined patterns of dates may be ordinal date patterns. For example, in one implementation of the chunking module, only the order of month, day, year, and splitter are used in valid date patterns. Examples of such valid date patterns may be:

i. <Month><Splitter ><Day><Splitter><Year>
   ii. <Year><Splitter><Month><Splitter><Day>
   iii. <Day><Splitter><Month><Splitter><Year>
   iv. <Year><Splitter><Day><Splitter><Month>

In one implementation, the date chunking module 116 generates additional date patterns by applying the following rules:

a. Omit the left parts or right parts in each pattern
   b. Replace Month or Day by MonthOrDay While in one implementation, the predetermined patterns of dates may be ordinal Subsequently, the date chunking module 316 matches the token sequence as generated by the tokenizer module 112 to the date patterns. In one implementation, the date chunking module 116 may infer the correct label for a token that is identified as <MonthOrDay> based on the token sequence pattern. For example, a token labeled as <MonthOrDay> in a sequence of "<Month><Splitter><MonthOrDay><Splitter><Year>" is identified as <Day>.

A date range chunking module 118 defines a number of predetermined valid patterns of date ranges. Some of these predetermined patterns of date ranges may be cardinal patterns of date ranges, whereas others of the predetermined patterns of date ranges may be ordinal patterns of date ranges. Examples of such predetermined valid patterns of date ranges may be as following:

a. MDY, MDY
   b. MD, MDY
   c. YMD, YMD
   d. YMD, MD
   e. YMD, D
   f. DMY, DMY
   g. DM, DMY
   h. D, DMY
   i. YDM, YDM
   j. YDM, DM
   k. YM, YM
   l. YM, M
   m. MY, MY
   n. Y, Y

In one implementation, the date range chunking module 118 generates more valid patterns by replacing M or D by MD (<MonthOrDay>). Subsequently, the date range chunking module 118 matches the date range patters with the range of dates as identified by the date chunking module 116. In one implementation, the date range chunking module 118 defines rules to check the content between two dates as identified by the date chunking module 116. An example, of such rules may be the word count between the dates, the words that are allowed between dates, etc. For example, if the date range chunking module determines that a pair of dates can be merged to a date range, any token labeled as <MonthOrDay> is inferred according to the following rules:

The order of month, day, year in two dates should be consistent
   The end date should be later than start date For example, the date range chucking module 118 interprets a pair of dates "1/4/2018~2/3/2018" as MDY~MDY.

Subsequently, a validation module 120 validates labeling of all tokens as dates, including the tokens that are labeled as part of date ranges. For example, one rule used by the validation module 120 may be that the start dates are earlier than the end date in a date range. In one implementation, the validation module 120 may be customized for addition of other validation rules thereto, such as a rule that requires a date range to be within one year, etc. The validation module 120 generates the date range output 150 with substantially high level of precision and recall rate. The date extractor system 100 may also be applied to languages other than English by changing the corresponding patterns and vocabulary.

Figure 2:
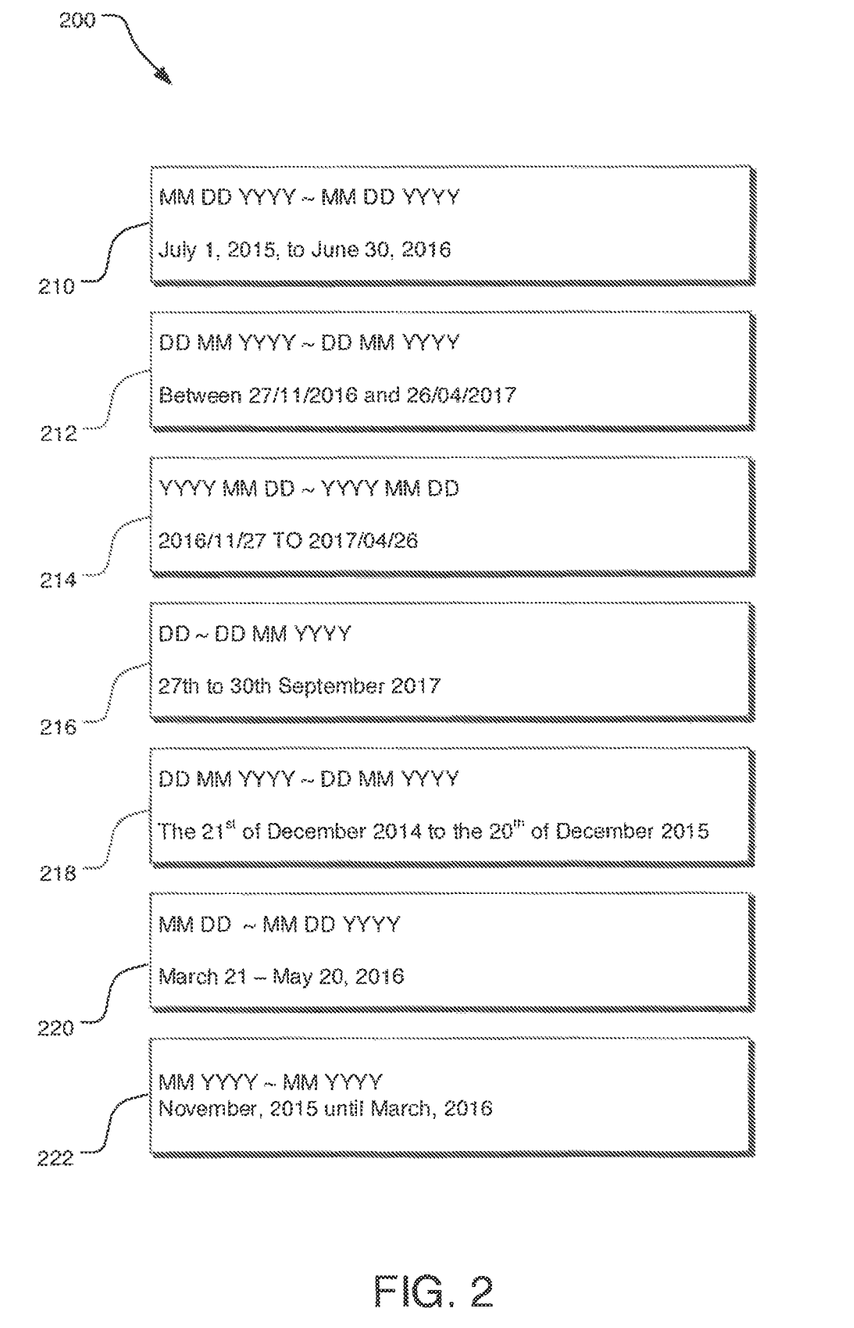
FIG. 2 illustrates an example illustrations for dates and date ranges in documents.

FIG. 2 illustrates example illustrations for dates and date ranges 200 in various natural language documents. For example, a date range 210 enumerates dates as MM DD YYYY~MM DO YYYY. A date range 212 enumerates dates as DD MM YYYY~DD MM YYYY. A date range 214 enumerates dates as YYYY MM DD~YYYY MM DD. A date range 216 enumerates dates as DD~DD MM YYYY. A date range 216 enumerates dates as DD MM YYYY~DD MM YYYY. A date range 220 enumerates dates as MM DD~MM DD YYYY. Similarly, a date range 222 enumerates dates as MM YYYY~MM YYYY.

Figure 3:
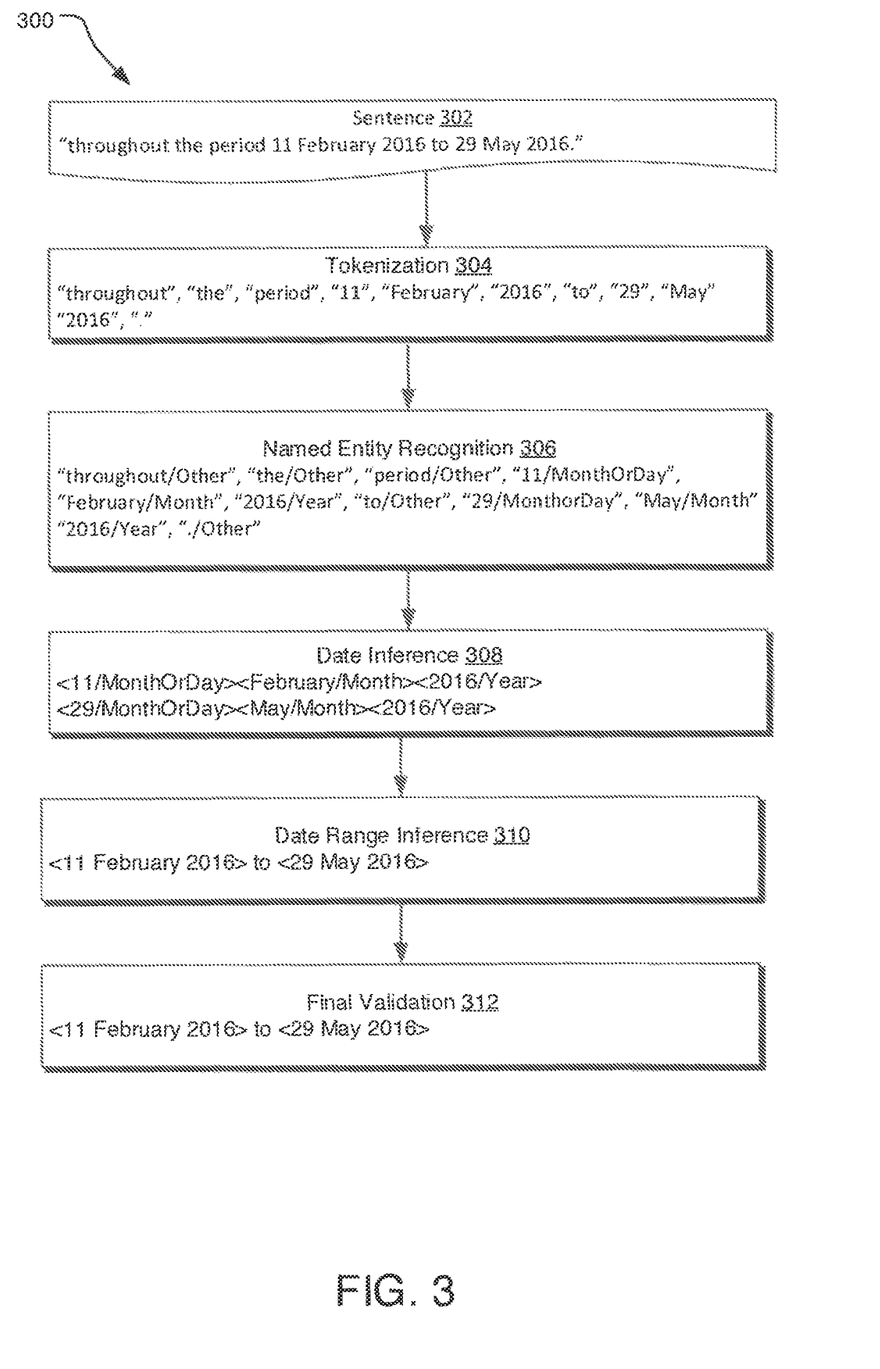
FIG. 3 illustrates an example operations for extracting date range using the technology disclosed herein.

FIG. 3 illustrates example operations 300 for extracting date range from a sentence 302 using the technology disclosed herein. The sentence 302, "throughout the period 11 February 2016 to 29 May 2016," may be scanned from a document. An operation 304 tokenizes the sentence into a number of tokens. In one implementation, any blank or empty space in the sentences scanned from the document may be ignored. As a result of the tokenizing operation 304, the sentence 302 is divided into tokens a follows:

"throughout", "the", "period", "11", "February", "2016", "to", "29", "May" "2016", "."

An operation 306 is a named entity recognition (NER) operation that labels one or more of the tokens with a named entity label. For example, such named entity labels may be <Day>, <Month>, <Year>,<MonthOrDay>, <Splitter>, <Other>, etc. For example, "throughout" is labeled as <Other>, "11" is labeled as <MonthOrDay>, etc.

An operation 308 is a date inference operation that defines valid patters of dates. The date inference operation 308 matches the token sequence as generated by the NER operation 306 to date patterns. The date inference operation 308 may also infer the correct label for a token that is identified as <MonthOrDay> based on the token sequence pattern. For example, based on the sequence of "<11/MonthOrDay>, <February/Month>, <2016/Year>," the date inference operation 308 may determine that given the second token <February/Month>being next to the first token "<11/MonthOrDay>", the first token is <Day>. Thus, it infers the sequence "<11/MonthOrDay>, <February/Month>, <2016/Year>," to be <11 February 2016>.

An operation 310 is a date range inference operation that infers the range of dates based on the output of the date inference operation 308. Specifically, the date range inference operation 310 fits the sequence of labeled tokens to one of various predefined date range patterns, Examples of such predefined date range patterns may be "MDY-MDY," "MD-MDY," "YMD-YMD," etc.

A validation operation 312 validates labeling of all tokens as dates, including the tokens that are labeled as part of date ranges. For example, the validation operation 3121 may compare the start date of the range (here <16 February 2016>) and the end date of the range (here <29 May 2016>) to ensure that the end date is higher than the start date.

Figure 4:
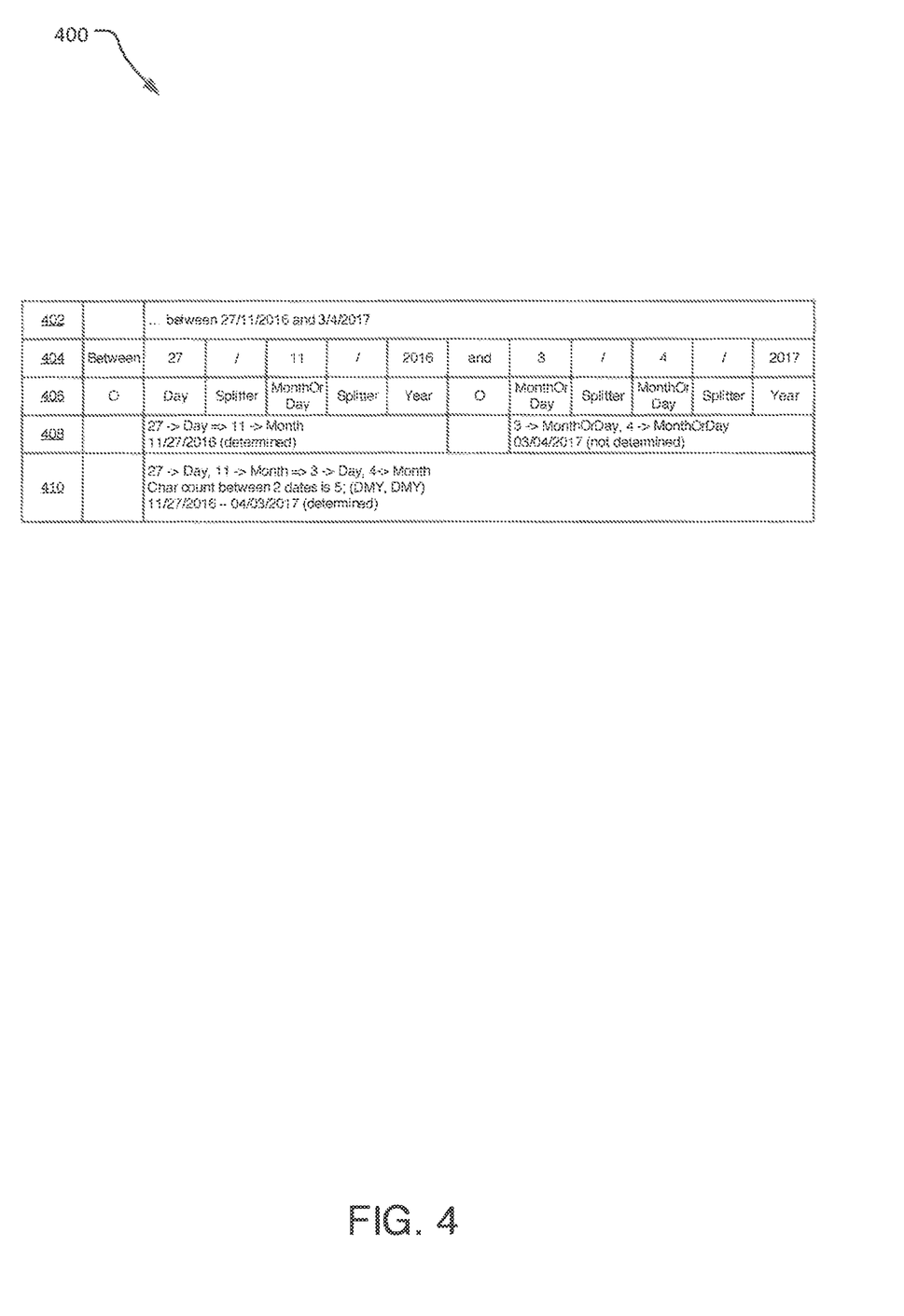
FIG. 4 illustrates an alternative example for extracting date range using the technology disclosed herein.

FIG. 4 illustrates an alternative schema 400 for extracting date range from a sentence 402 using the technology disclosed herein. Specifically, a row 404 illustrates the result of tokenization of the sentence 402.

A row 406 represents various named entities that can be used as labels for the tokens from the row 404. For example, the token "Between" is labeled as "O" (alternatively, "Other").

A row 408 represents inferred dates from the pair of tokens from the row 404 and named entities from the row 406. Finally, a row 410 represents interred date range.

Figure 5:
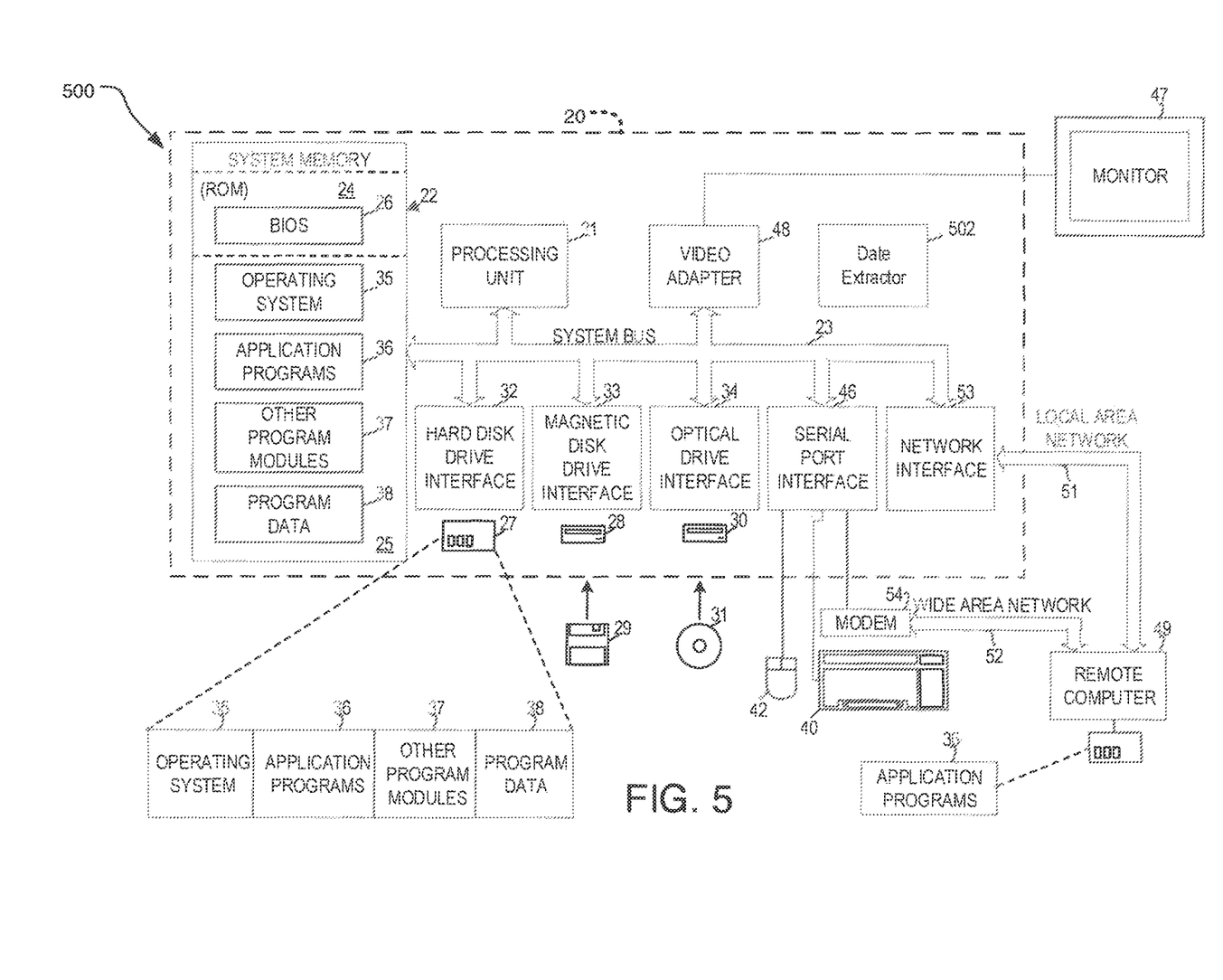
FIG. 5 illustrates an example computing system that may be useful in implementing the described technology for extracting dates and date ranges.

FIG. 5 illustrates an example system 500 that may be useful in implementing the described technology for providing attestable and destructible device identity. The example hardware and operating environment of FIG. 6 for implementing the described technology includes a computing device, such as a general-purpose computing device in the form of a computer 20, a mobile telephone, a personal data assistant (FDA), a tablet, smart watch, gaming remote, or other type of computing device. In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a date extractor module 502 may be implemented on the computer 20 (alternatively, the date extractor module 502 may be implemented on a server or in a cloud environment). The date extractor module 502 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carver wave or other signal transport mechanism. The term "modulated data signal" means a signal that has one or more of its characteristics set or changed in such a manner as to encode information in the signal, by way of example, and not limitation, intangible communication signals include wired media such as a wired network or direct-wired connection, and wireless media such as acoustic, RF, infrared and other wireless media.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage media, encoding computer-executable instructions for executing on a computer system a computer process to provide attestable and destructible device identity, the computer process comprising:
   scanning a document to generate a plurality of tokens;
   assigning labels to one or more of the plurality of tokens to generate named entities of a named entity vector, each of the named entities corresponding to a labeled token from among the plurality of tokens;
   extracting dates from the named entity vector by comparing a label of the labeled token of each of the named entities of the named entity vector to predetermined patterns of dates to generate a date vector;
   generating a plurality of date pairs from the date vector; and
   extracting date-ranges by comparing the plurality of date pairs to predetermined patterns of date ranges.

2. The physical article of manufacture of claim 1, wherein the computer process further comprises generating the predetermined patterns of dates using cardinal date values.

3. The physical article of manufacture of claim 1, wherein the computer process further comprises extracting content between the extracted date-ranges.

4. The physical article of manufacture of claim 1, wherein scanning a document to generate a plurality of tokens further comprises generating tokens representing each of words, numbers, and other symbols within a sentence.

5. The physical article of manufacture of claim 1, wherein assigning labels to one or more of the plurality of tokens further comprises using named entity recognition (NER) to assign labels to tokens.

6. The physical article of manufacture of claim 5, wherein using named entity recognition (NER) to assign labels to tokens further comprises assigning a MonthOrDay label to one or more tokens representing at least one of date and month.

7. The physical article of manufacture of claim 6, wherein the computer process further comprises reassigning a token with the MonthOrDay label to one of date label or a month label based on analysis of other tokens in the named entity vector.

8. The physical article of manufacture of claim 6, wherein the computer process further comprises labeling tokens other than the tokens representing one of date, month, and splitter token as Other.

9. In a computing environment, a method performed at least in part on at least one processor, the method comprising:
   scanning a document to generate a plurality of tokens;
   assigning labels to one or more of the plurality of tokens to generate named entities of a named entity vector, each of the named entities corresponding to a labeled token from among the plurality of tokens;
   extracting dates from the named entity vector by comparing a label of the labeled token of each of the named entities of the named entity vector to predetermined patterns of dates to generate a date vector;
   generating a plurality of date pairs from the date vector; and
   extracting date-ranges by comparing the plurality of date pairs to predetermined patterns of date ranges.

10. The method of claim 9, wherein the method further comprises generating the predetermined patterns of dates using cardinal date values.

11. The method of claim 9, wherein the method further comprises wherein the computer process further comprising extracting content between the extracted date-ranges.

12. The method of claim 9, wherein scanning a document to generate a plurality of tokens further comprises generating tokens representing each of words, numbers, and other symbols within a sentence.

13. The method of claim 9, wherein assigning labels to one or more of the plurality of tokens further comprises using named entity recognition (NER) to assign labels to tokens.

14. The method of claim 13, wherein using named entity recognition (NER) to assign labels to tokens further comprises assigning a MonthOrDay label to one or more tokens representing at least one of date and month.

15. The method of claim 14, wherein the method further comprises reassigning a token with the MonthOrDay label to one of date label or a month label based on analysis of other tokens in the named entity vector.

16. In a computing environment, a system comprising:
   memory;
   one or more processor units;
   a document issue scanner system stored in the memory and executable by the one or more processor units, the document issue scanner system encoding computer-executable instructions on the memory for executing on the one or more processor units a computer process, the computer process comprising:
   scanning a document to generate a plurality of tokens;
   assigning labels to one or more of the plurality of tokens using named entity recognition (NER) machine to generate named entities of a named entity vector, each of the named entities corresponding to a labeled token from among the plurality of tokens;
   extracting dates from the named entity vector by comparing a label of the labeled token of each of the named entities of the named entity vector to predetermined patterns of dates to generate a date vector;
   generating a plurality of date pairs from the date vector; and extracting date-ranges by comparing the plurality of date pairs to predetermined patterns of date ranges.

17. The system of claim 16, wherein scanning a document to generate a plurality of tokens further comprises generating tokens representing each of words, numbers, and other symbols within a sentence.

18. The system of claim 16, wherein assigning labels to one or more of the plurality of tokens further comprises using named entity recognition (NER) to assign labels to tokens.

19. The system of claim 18, wherein using named entity recognition (NER) to assign labels to tokens further comprises assigning a MonthOrDay label to one or more tokens representing at least one of date and month.

20. The system of claim 19, wherein the computer process further comprises reassigning a token with the MonthOrDay label to one of date label or a month label based on analysis of other tokens in the named entity vector.

* * * * *